(12) United States Patent
Kimura et al.

(10) Patent No.: US 12,312,766 B2
(45) Date of Patent: May 27, 2025

(54) FAN STRUCTURE AND WORK VEHICLE

(71) Applicant: Kubota Corporation, Osaka (JP)

(72) Inventors: Taketo Kimura, Sakai (JP); Motoshi Suma, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 575 days.

(21) Appl. No.: 17/824,896

(22) Filed: May 26, 2022

(65) Prior Publication Data

US 2023/0003001 A1    Jan. 5, 2023

(30) Foreign Application Priority Data

Jun. 30, 2021    (JP) .................................. 2021-109061

(51) Int. Cl.
| | |
|---|---|
| *E02F 9/08* | (2006.01) |
| *B60K 11/06* | (2006.01) |
| *F04D 19/00* | (2006.01) |
| *F04D 29/64* | (2006.01) |

(52) U.S. Cl.
CPC ............ *E02F 9/0866* (2013.01); *B60K 11/06* (2013.01); *F04D 19/002* (2013.01); *F04D 29/644* (2013.01)

(58) Field of Classification Search
CPC ..... E02F 9/0866; E02F 9/0833; E02F 9/0808; B60K 11/06; B60K 11/00; B60Y 2200/411; B60S 5/00; F04D 19/002; F04D 29/644; F04D 29/522; F04D 29/582; F04D 29/601; F04D 25/04; F01P 3/20; F01P 7/044; F01P 3/18; F01P 11/10
See application file for complete search history.

(56) References Cited

U.S. PATENT DOCUMENTS

| | | | |
|---|---|---|---|
| 4,138,857 A | * | 2/1979 | Dankowski ........... F25B 49/027 62/239 |
| 5,943,986 A | | 8/1999 | Kern et al. |
| 9,752,302 B2 | | 9/2017 | Yamashita et al. |
| 9,988,790 B2 | | 6/2018 | Yamashita et al. |

(Continued)

FOREIGN PATENT DOCUMENTS

| | | | |
|---|---|---|---|
| EP | 0304080 A2 | * | 2/1989 |
| JP | 60-034599 U | | 3/1985 |

(Continued)

OTHER PUBLICATIONS

Decision to Grant a Patent for corresponding JP Application No. 2021-109061, Apr. 23, 2024 (w/ machine translation).

(Continued)

*Primary Examiner* — Steve Clemmons
(74) *Attorney, Agent, or Firm* — MORI & WARD, LLP

(57) ABSTRACT

A fan structure is provided with a fan, a fan support, a base, and a motor. The fan is provided with a rotational shaft rotatable about a rotational shaft, and a blade coupled to the rotational shaft to rotate about the rotational axis together with the rotational shaft. The fan support rotatably supports the rotational shaft. The base slidably supports the fan support so as to be slidable in the sliding direction. The motor includes a motor main body supported by a fan support opposite to the rotational shaft of the fan in the axial direction along the rotational axis, and a motor rotational shaft connected to the rotational shaft so as to rotate the rotational shaft.

20 Claims, 11 Drawing Sheets

(56) References Cited

U.S. PATENT DOCUMENTS

| | | | |
|---|---|---|---|
| 10,079,526 B2 * | 9/2018 | Shatek | F01P 11/04 |
| 10,174,481 B2 * | 1/2019 | Best | F04D 29/526 |
| 10,273,653 B1 * | 4/2019 | Mori | E02F 9/0866 |
| 10,584,465 B2 * | 3/2020 | Sakon | B60K 11/02 |
| 10,948,248 B2 * | 3/2021 | Cummins | F28F 9/0131 |
| 11,085,362 B2 * | 8/2021 | Sovine | F02B 29/0456 |
| 2006/0219451 A1 * | 10/2006 | Schmitt | B60K 11/04 180/68.4 |
| 2016/0090712 A1 * | 3/2016 | Yamashita | B60K 11/04 180/68.1 |
| 2023/0003001 A1 | 1/2023 | Kimura et al. | |

FOREIGN PATENT DOCUMENTS

| | | | |
|---|---|---|---|
| JP | 60-175815 U | | 11/1985 |
| JP | H0644377 U | * | 6/1994 |
| JP | 2005-146948 | | 6/2005 |
| JP | 2016-068859 | | 5/2016 |

OTHER PUBLICATIONS

Japanese Office Action for corresponding JP Application No. 2021-109061, Jan. 16, 2024 (w/ machine translation).

* cited by examiner

FIG. 8
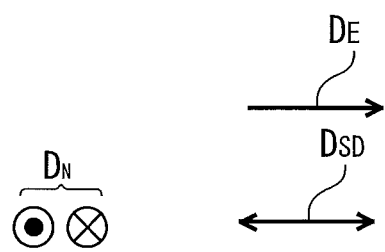
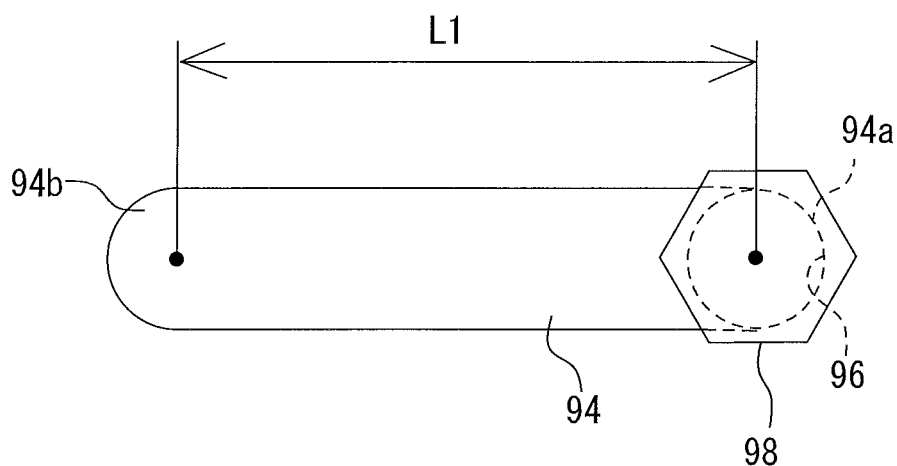

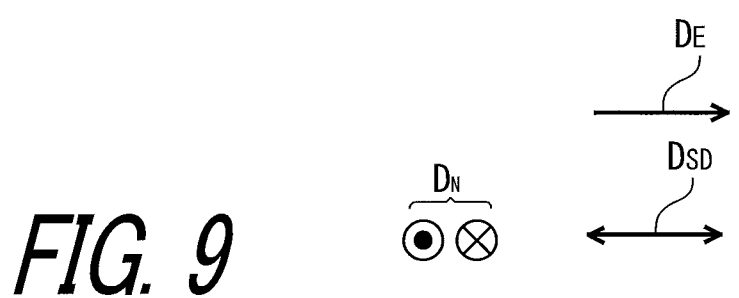
FIG. 9
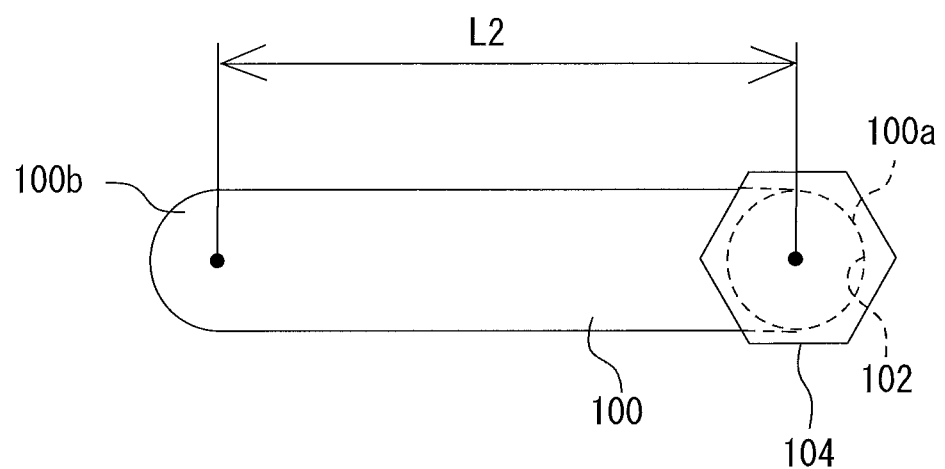

FAN STRUCTURE AND WORK VEHICLE

CROSS-REFERENCE TO RELATED APPLICATIONS

The present application claims priority under 35 U. S. C. § 119 to Japanese Patent Application No. 2021-109061, filed Jun. 30, 2021. The contents of this application are incorporated herein by reference in their entirety.

BACKGROUND OF THE INVENTION

Field of the Invention

The present invention relates to a work vehicle and a fan structure provided in a work vehicle.

Discussion of the Background

U.S. Pat. Nos. 9,752,302 and 9,988,790 disclose a fan structure provided above an engine of a work vehicle. In the fan structure, a motor for rotating the fan is provided below the rotational shaft of the fan. U.S. Pat. Nos. 9,752,302 and 9,988,790 indicate that at least a part of a duct dividing a fan structure and an engine compartment can be removed for maintenance purposes.

SUMMARY OF THE INVENTION

According to one aspect of the present disclosure, the fan structure includes a fan, a fan support, a base, and a motor. The fan is provided with a rotational shaft rotatable about a rotational axis, and a blade coupled to the rotational shaft to rotate about the rotational axis together with the rotational shaft. The fan support rotatably supports the rotational shaft. The base slidably supports the fan support in a sliding direction. The motor includes a motor main body supported by a fan support opposite to the rotational shaft of the fan in an axial direction along the rotational axis, and a motor rotational shaft connected to the rotational shaft so as to rotate the rotational shaft.

According to another aspect of the present disclosure, a work vehicle is provided with an exterior frame forming an engine compartment and a fan structure according to the first aspect. The base is connected to the exterior frame. The motor is located closer to the engine compartment than the fan.

BRIEF DESCRIPTION OF DRAWINGS

A more complete appreciation of the present disclosure and many of the attendant advantages thereof will be readily obtained as the same becomes better understood by reference to the following detailed description when considered in connection with the accompanying drawings.

FIG. 8 is a bottom view of the first slot.
FIG. 9 is a bottom view of the second slot.

DESCRIPTION OF THE EMBODIMENTS

Figure 1:
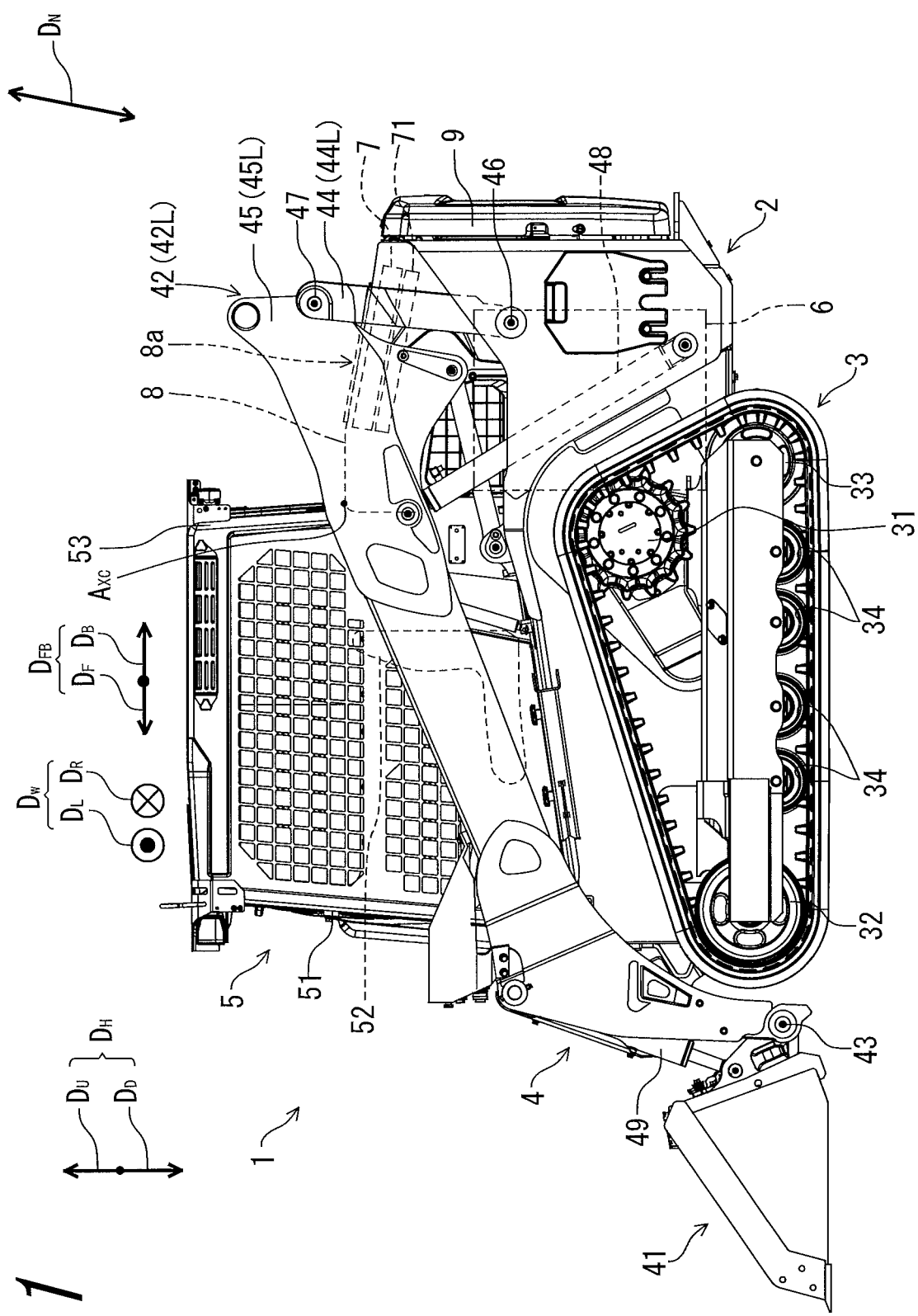
FIG. 1 is a side view of a work vehicle.

An embodiment of the present invention will be described below in detail with reference to the drawings. In the drawings, the same reference numerals indicate corresponding or substantially identical configurations.

Exemplary Embodiment

<Overall Configuration>

Figure 2:
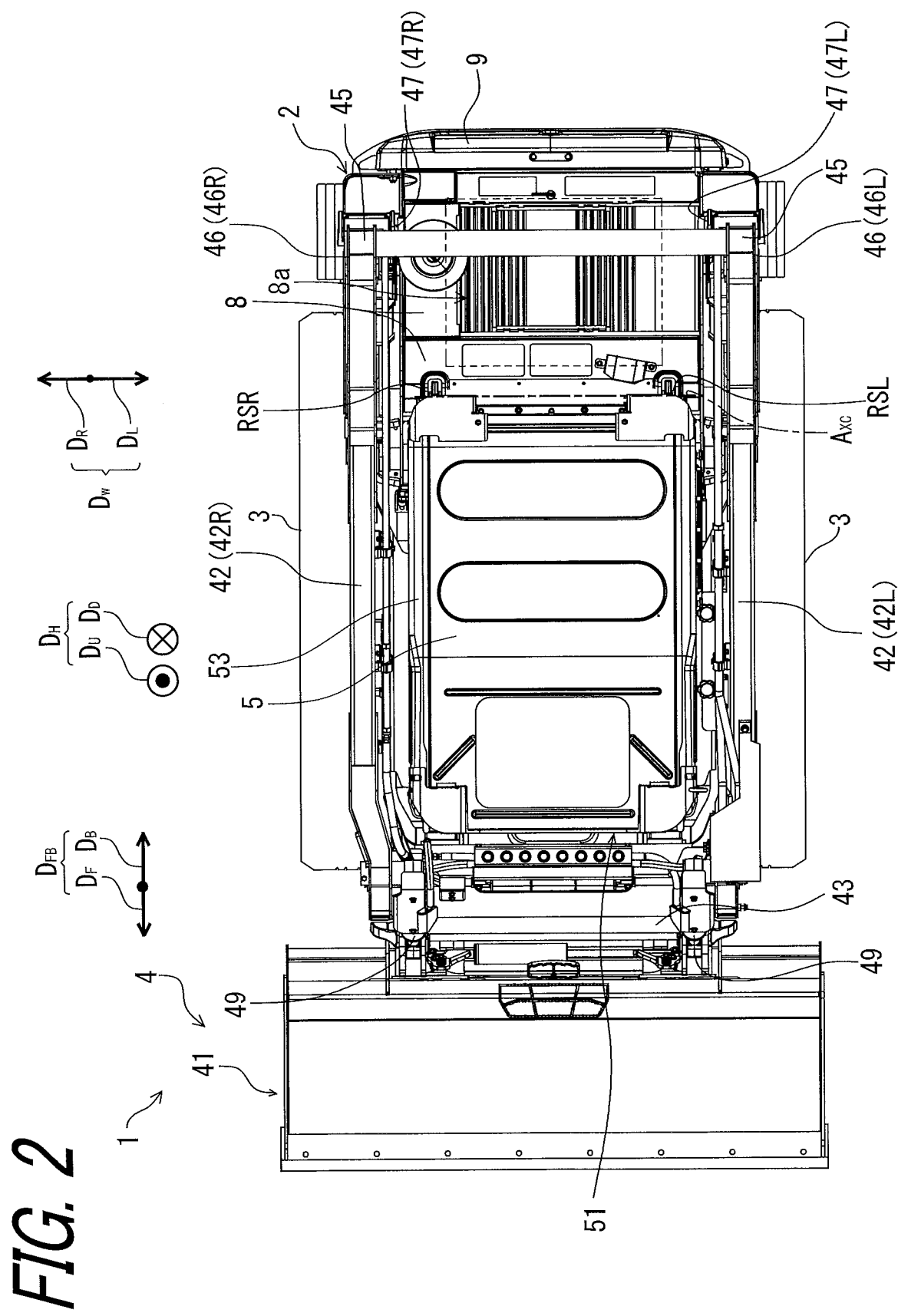
FIG. 2 is a top view of a work vehicle.
Figure 3:
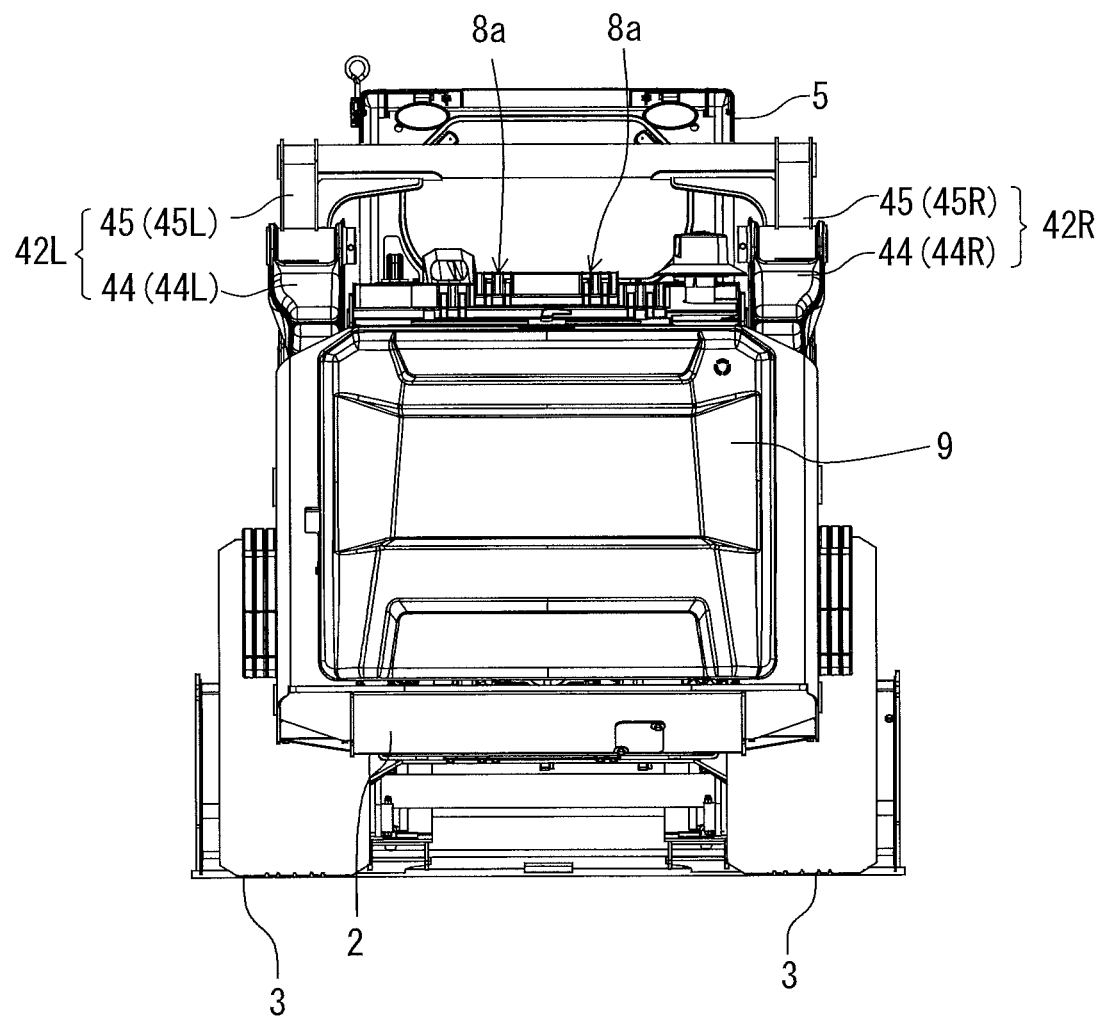
FIG. 3 is a rear view of a work vehicle.

Referring to FIGS. 1 to 3, a work vehicle 1, for example, a compact truck loader 1, includes a vehicle body frame 2, a traveling device 3, a working device 4, and a cabin 5. The vehicle body frame 2 supports the traveling device 3, the working device 4, and the cabin 5. In the illustrated embodiment, the traveling device 3 is a crawler type traveling device. Therefore, the traveling device 3 includes the drive wheels 31, the driven wheels 32 and 33, and the rolling wheels 34. However, the traveling device 3 is not limited to a crawler type traveling device. The traveling device 3 may be, for example, a front wheel/rear wheel traveling device, or a traveling device having a front wheel and a rear crawler. The working device 4 includes work implement (bucket) 41 at the distal end of working device 4. A proximal end of the working device 4 is attached to a rear portion of the vehicle body frame 2. The working device 4 includes a pair of arm assemblies 42 for rotatably supporting the bucket 41 via the bucket pivot shaft 43. Each of the pair of arm assemblies 42 has a lift link 44 and an arm 45.

The lift link 44 is rotatable with respect to the vehicle body frame 2 around a fulcrum shaft 46. The arm 45 is rotatable with respect to the lift link 44 about the joint shaft 47. The working device 4 further includes a plurality of boom cylinders 48 and at least one work implement cylinder 49. Each of the plurality of boom cylinders 48 is rotatably connected to the vehicle body frame 2 and the arm 45, and moves the lift link 44 and the arm 45 to raise and lower the bucket 41. At least one work implement cylinder 49 is configured to tilt the bucket 41. The cabin 5 is attached to a front portion of the vehicle body frame 2. A work vehicle 1 is provided with a front door 51 in front of a cabin 5, and a driver's seat 52 and an operating device (not illustrated) are provided in the cabin 5. The interior space of the cabin 5 is defined by the cab frame 53. As shown in FIG. 2, the cab frame 53 is rotatable about rotational shafts RSL and RSR on the vehicle body frame 2. FIGS. 1 and 2 show a common rotational axis $A_{XC}$ defined as the rotational shaft RSL and RSR. As shown in FIG. 2, the rotational shafts RSL and RSR are along the width direction $D_W$ of the work vehicle 1.

In the embodiment according to the present application, the longitudinal direction $D_{FB}$ (forward $D_F$/backward $D_B$) means a front-back direction (forward/backward direction) as seen from an operator seated on the driver's seat 52 of the cabin 5. The left direction $D_L$, the right direction $D_R$, and the width direction $D_W$ mean right direction, left direction, width direction respectively as viewed from the operator. Up direction $D_U$, down direction $D_D$, height $D_H$ mean an upward direction, a downward direction and a height direction as viewed from the operator. The front/back, left/right (width), and up/down (height) directions of the work vehicle 1 correspond to the front/back, left/right (width), up/down (height) directions as viewed from the operator.

In FIG. 1, one of the pair of arm assemblies 42 is provided on the left side of the cabin 5. The other of the pair of arm assemblies 42 is provided on the right side of the cabin 5. More specifically, one of the boom cylinder 48 and one of the arm 45 are provided on the left side of the cabin 5. The other of the boom cylinder 48 and the other of the arm 45 are provided on the right side of the cabin 5. FIG. 1 shows the left side of the work vehicle 1. As shown in FIGS. 2 and 3, the vehicle body frame 2 is substantially symmetrical with respect to the vehicle body center plane M, and the arm assembly 42 provided on the left side with respect to the vehicle body center plane M is shown as a first arm assembly 42L, and the arm assembly 42 provided on the right side with respect to the vehicle body center plane M is shown as a second arm assembly 42R. The lift link 44 provided on the left side with respect to the vehicle body center plane M is shown as a first lift link 44L, and the lift link 44 provided on the right side with respect to the vehicle body center plane M is shown as a second lift link 44R. An arm 45 provided on the left side with respect to the vehicle body center plane M is shown as a first arm 45L, and an arm 45 provided on the right side with respect to the vehicle body center plane M is shown as a second arm 45R. A fulcrum shaft 46 provided on the left side of the vehicle body center plane M is shown as a first fulcrum shaft 46L, a fulcrum shaft 46 provided on the right side of the vehicle body center plane M is shown as a second fulcrum shaft 46R. A joint shaft 47 provided on the left side with respect to the vehicle body center plane M is shown as a first joint shaft 47L, and a joint shaft 47 provided on the right side with respect to the vehicle body center plane M is shown as a second joint shaft 47R.

Referring to FIG. 1, the work vehicle 1 further includes an engine 6 and a heat exchanger 7 provided at a rear portion of the vehicle body frame 2. The engine 6 is configured to provide driving force to the traveling device 3 and the working device 4. The heat exchanger 7 includes a radiator for cooling the refrigerant of the engine 6. Further, preferably, the heat exchanger 7 includes an oil cooler configured to cool hydraulic fluid used in the hydraulic system of the work vehicle 1 (e.g., boom cylinder 48 and at least one instrument cylinder 49). The work vehicle 1 includes a fan 71 for air-cooling the heat exchanger 7. The engine 6 and the heat exchanger 7 are provided between a pair of arm assemblies 42 in the width direction $D_W$ of the work vehicle 1.

The work vehicle 1 is further provided with a cover 8 for covering the heat exchanger 7. The cover 8 further covers the engine 6. An air suction port 8a for taking air into the inside of the cover 8 is provided on the upper surface of the cover 8. The work vehicle 1 further includes a bonnet cover 9 provided at the rear end of the vehicle body frame 2. Bonnet cover 9 is openable and thus a maintenance worker can perform maintenance work on the engine 6 and the like.

Figure 4:
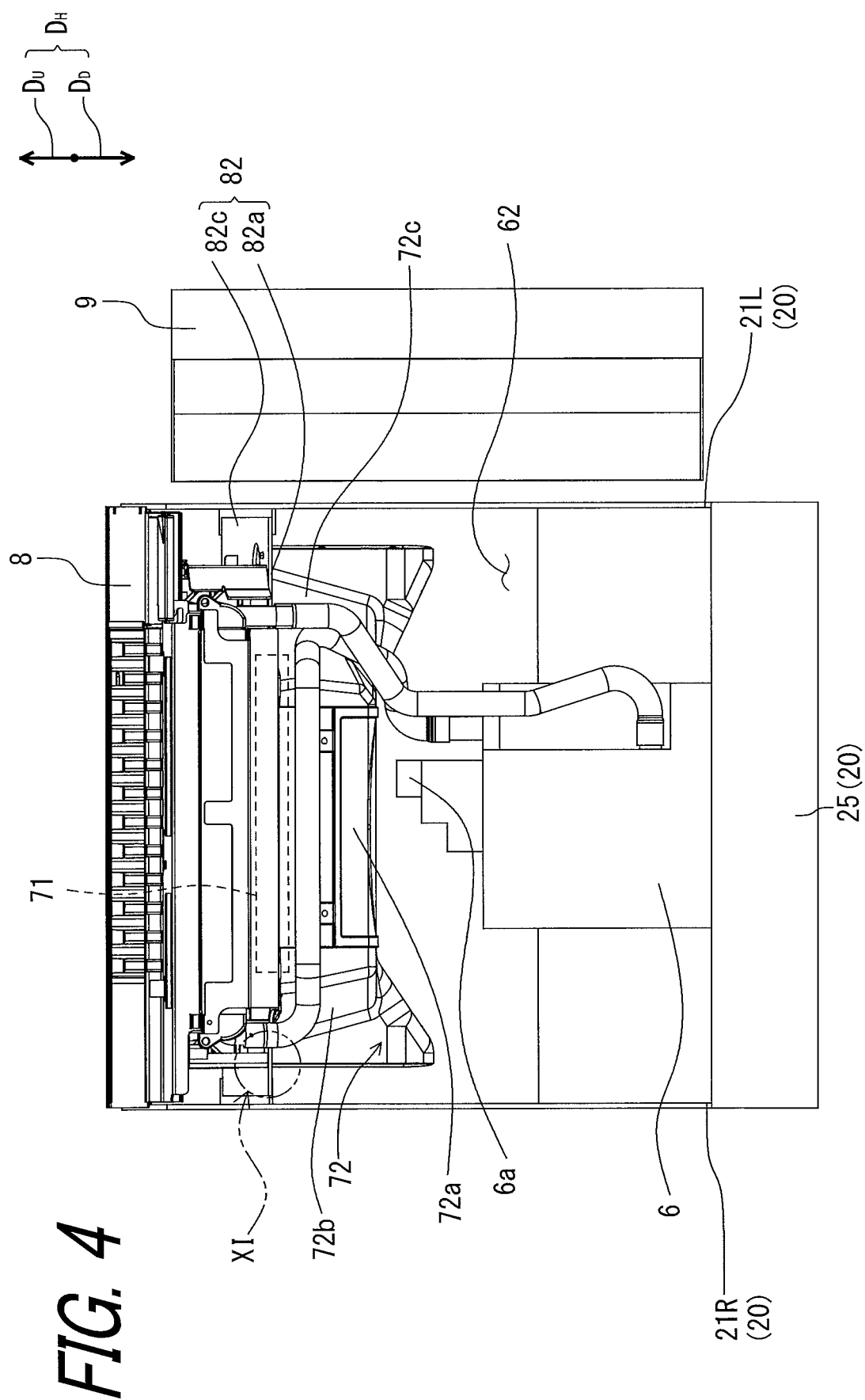
FIG. 4 is a view showing the inside of the engine compartment when the bonnet cover is opened.

Further, referring to FIG. 1, a fan 71 is located in the upper portion $D_U$ of the engine. The heat exchanger 7 is located above $D_U$ of the fan 71. The cover 8 having the air suction port 8a is located above $D_U$ of the heat exchanger 7. As the fan 71 rotates, air is sent from the air suction port 8a to the heat exchanger 7. FIG. 4 is a view showing the inside of the engine compartment 62 when the bonnet cover 9 is opened. In FIG. 4, the structure of the engine 6 is schematically shown, and a part of the structure of the engine 6 is not shown. As shown in FIG. 4, a duct 72 is provided between the fan 71 and the engine 6, and the duct 72 prevents the air heated through the heat exchanger 7 from flowing into the engine compartment 62. The duct 72 also prevents outside air containing dust from flowing into the engine compartment 62. As will be described in detail later, a portion of the duct 72 is removable. The engine compartment 62 is a space surrounded by the cabin 5, the duct 72, the first inner wall 21L, the second inner wall 21R, the bottom wall 25, and the bonnet cover 9. Of these, the first inner wall 21L, the second inner wall 21R, and the bottom wall 25 are collectively referred to as an exterior frame 20 forming the engine compartment 62. The work vehicle 1 is further provided with an exterior frame 20 and a fan structure 80 including a fan 71 and a duct 72.

Figure 5:
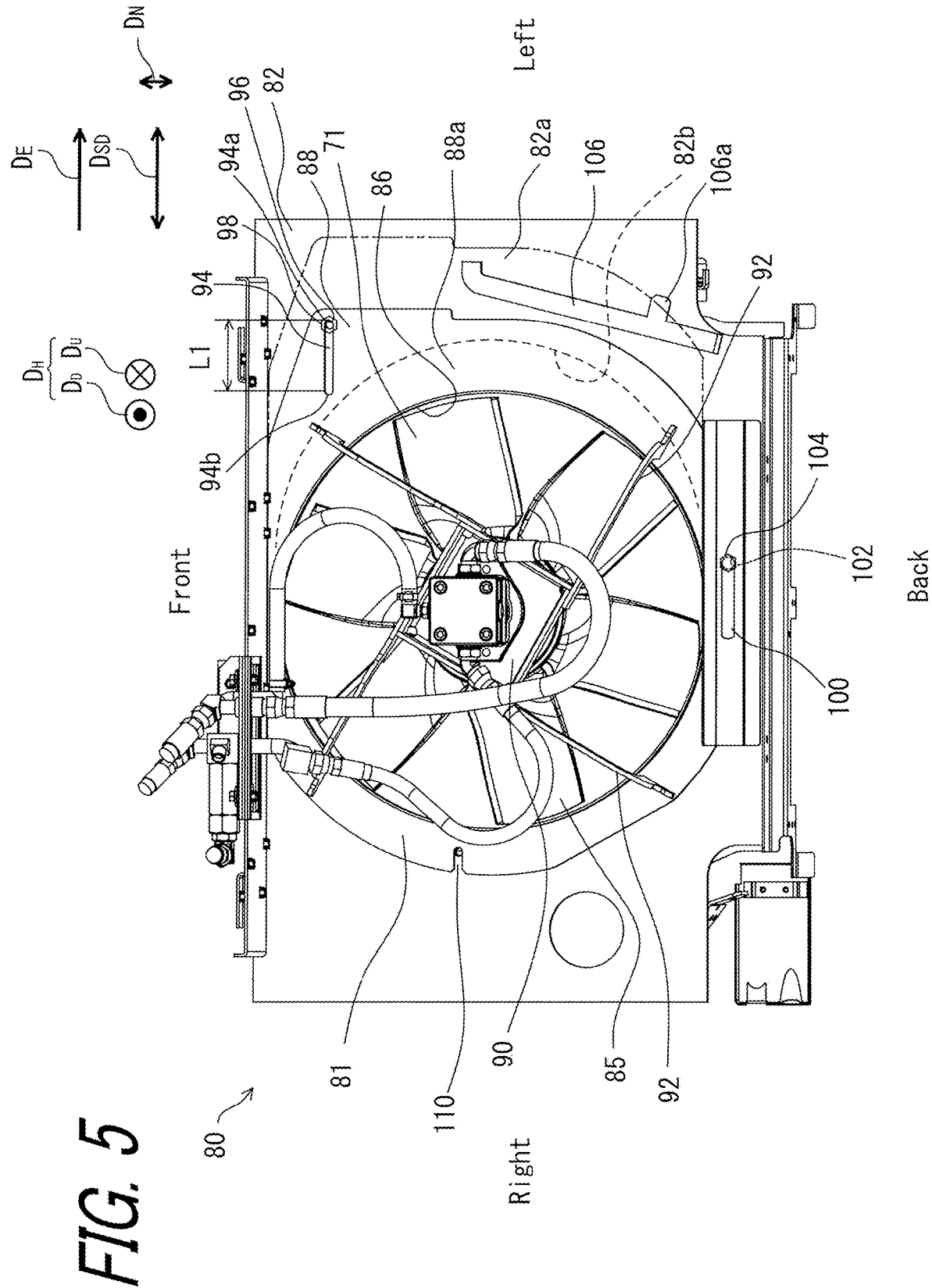
FIG. 5 is a bottom view of the fan structure.
Figure 6:
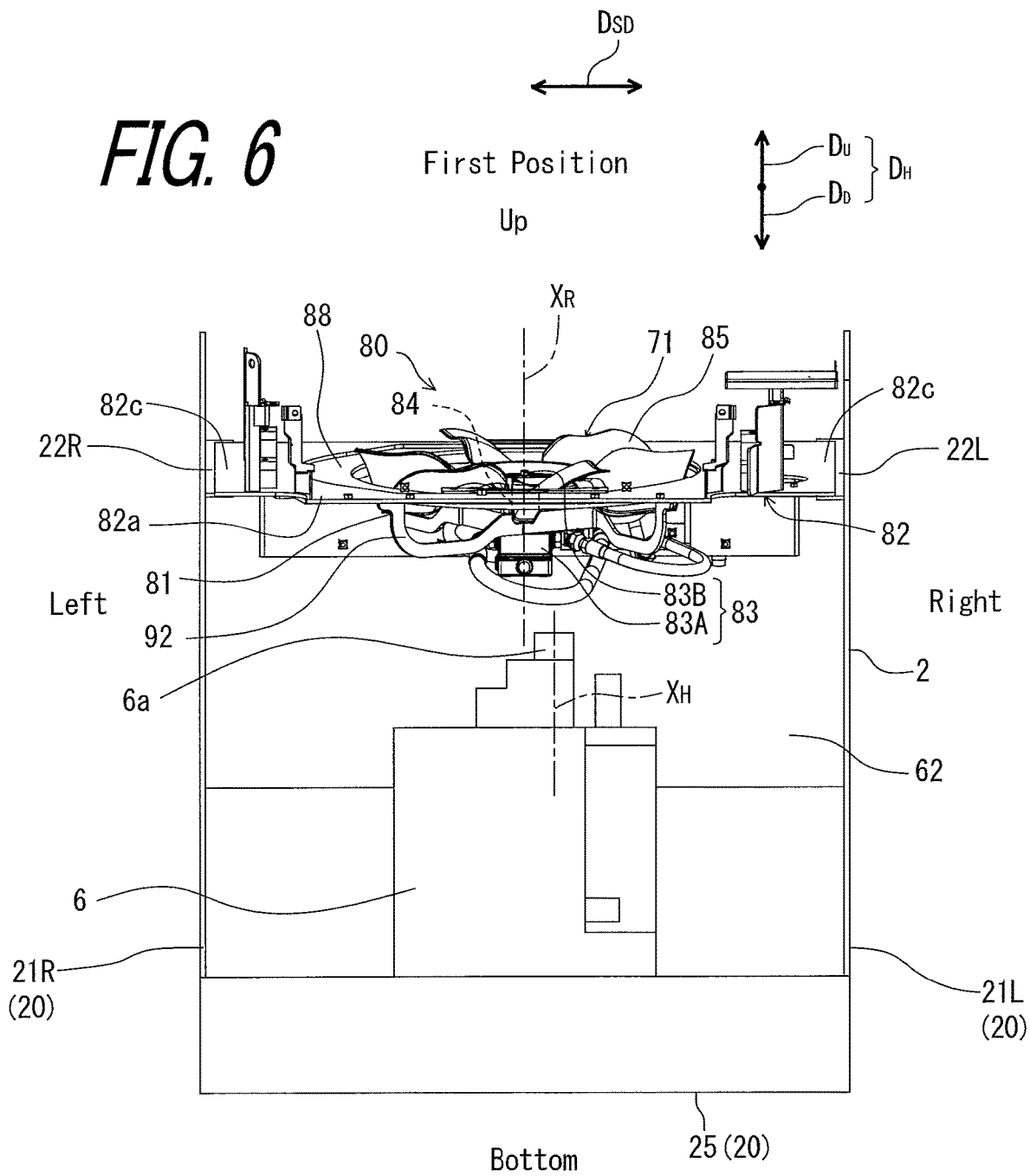
FIG. 6 is a rear view of the fan structure in the first position.

FIG. 5 is a view of the fan structure 80 as viewed from below. FIG. 6 is a view of the fan structure 80 as viewed from the rear. In the figure, up, down, front, back, left and right are directions as seen from an operator seated on the driver's seat 52. In FIGS. 5 and 6, illustration of the duct 72 is omitted in order to show the fan 71 and its mounting configuration. Referring to FIGS. 5 and 6, the fan structure 80 includes the fan 71 described above, a fan support 81, a base 82, and a motor 83. The motor 83 is a hydraulic motor and has a motor main body 83A and a motor rotational shaft 83B. The fan 71 has a rotational shaft 84 rotatably provided around the rotational axis $X_R$ and a blade 85 connected to the rotational shaft 84 and rotatable around the rotational axis $X_R$ together with the rotational shaft 84. The rotational shaft 84 has one end and the other end opposite to the one end in the direction of the rotational axis $X_R$. The fan support 81 supports the rotational shaft 84 via the motor 83. The base 82 is disposed so as to face the fan support 81, and supports the fan support 81 such that the respective facing surfaces are substantially parallel to each other. The fan support 81 is supported so as to be slidable in the sliding direction $D_{SD}$ along respective opposing surfaces with respect to the base 82. The sliding direction $D_{SD}$ is perpendicular to the surface normal direction $D_N$ of the opposing surface. As shown in FIG. 1, the surface normal direction $D_N$ is slightly inclined to the backward $D_B$ with respect to the height direction $D_H$. The rotational axis $X_R$ described above is substantially parallel to the surface normal direction $D_N$. The motor main body 83A is supported by a fan support 81. The motor rotational shaft 83B is connected to the rotational shaft 84 so as to rotate the rotational shaft 84. The motor 83 is located closer to the engine compartment 62 than the fan 71.

The fan support 81 has a base plate 88 having a circular first opening 86, a support plate 90 for supporting the motor main body 83A, and a plurality of beams 92 for connecting the support plate 90 and the base plate 88. The fan 71 is supported by the fan support 81 so that the inner periphery of the first opening 86 surrounds the outer periphery of the blade 85 centered on the rotational axis $X_R$.

Referring to FIG. 6, the base 82 has a top plate 82a and an attachment 82c. The top plate 82a and the base plate 88 of the fan support 81 are opposed to each other so as to be substantially parallel to the sliding direction $D_{SD}$. That is, the base plate 88 and the top plate 82a extend in a direction perpendicular to the common surface normal direction $D_N$. The attachment 82c is connected to the top plate 82a and attached to an upper portion of an exterior frame 20 forming an engine compartment 62 of the work vehicle 1. More specifically, the attachment 82c is placed on a first mounting plate 22L extending from a first inner wall 21L and a second mounting plate 22R extending from a second inner wall (21R). In the present embodiment, the attachment 82c is formed of the same plate member as the top plate 82a, but may be formed of another member. Referring to FIG. 5, the top plate 82a has a second opening 82b. The second opening 82b has a substantially elongated hole shape formed by connecting two circles having the same radius with a common external tangent line. The common external tangent line is substantially parallel to the sliding direction $D_{SD}$. The minor diameter of the second opening 82b is substantially equal to or slightly larger than the radius of the first opening 86.

Referring to FIGS. 5 and 8, the base plate 88 has a first slot 94 extending in the sliding direction $D_{SD}$. The first slot 94 has a first slot length L1. The first slot length L1 is the longest distance that the fan support 81 can slide with respect to the top plate 82a of the base 82 along the sliding direction $D_{SD}$. The top plate 82a has a first screw hole 96 in which a female screw is formed. The first screw hole 96 is arranged so as to be aligned with the first slot 94, and the first bolt 98 is inserted into the first slot 94 and the first screw hole 96 to connect the base plate 88 and the top plate 82a. By tightening the first bolt 98, the base plate 88 and the top plate 82a can be fixed. In this manner, the position of the base plate 88 relative to the top plate 82a is fixed by fixing the position of the first bolt 98 in the first slot 94. The base plate 88 may have the first screw hole, and the top plate 82a may have the first slot. Further, a nut may be provided without forming a female screw in the first screw hole 96.

Referring to FIGS. 5 and 9, the base plate 88 has a second slot 100 extending in the sliding direction $D_{SD}$. The second slot 100 has a second slot length L2. The second slot length L2 is equal to the first slot length L1. The top plate 82a has a second screw hole 102 in which a female screw is formed. The second screw hole 102 is arranged to be aligned with the second slot 100, and the second bolt 104 is inserted into the second slot 100 and the second screw hole 102. The base plate 88 and the top plate 82a are connected to each other. By tightening the second bolt 104, the base plate 88 and the top plate 82a can be fixed. Since the position of the second bolt 104 in the second slot 100 is fixed, the position of the base plate 88 for top plate 82a is fixed. The base plate 88 may have the second screw hole 102, and the top plate 82a may have the second slot. Further, a nut may be provided without forming a female screw in the second screw hole 102. By providing two slots such as the first slot 94 and the second slot 100, the rotation of the base plate 88 can be suppressed when the base plate 88 slides with respect to the top plate 82a.

Figure 10:
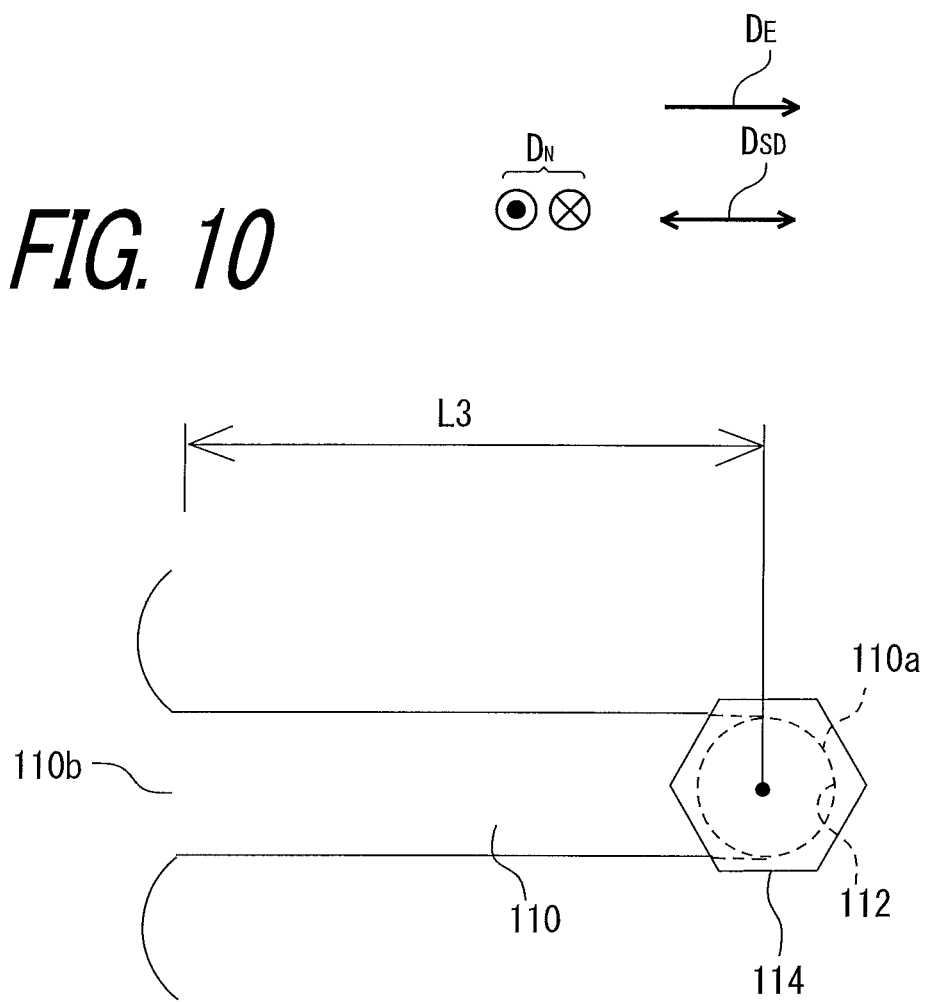
FIG. 10 is a bottom view of the third slot.

Referring to FIGS. 5 and 10, the base plate 88 has a third slot 110 extending in the sliding direction $D_{SD}$. The third slot 110 has a third slot length L3. The third slot length L3 is shorter than the first slot length L1. The top plate 82a has a third screw hole 112 in which a female screw is formed. The third screw hole 112 is arranged so as to be aligned with the third slot 110, and the third bolt 114 is inserted into the third slot 110 and the third screw hole 112 to connect the base plate 88 and the top plate 82a. The base plate 88 and the top plate 82a can be fixed to each other by tightening the third bolt 114. The base plate 88 may have a third screw hole, and the top plate 82a may have a third slot. Further, a nut may be provided without forming a female screw in the third screw hole 112. By providing three slots such as the first slot 94, the second slot 100, and the third slot 110, the base plate 88 can be stably fixed to the top plate 82a.

Next, the duct 72 will be described. FIG. 4 is a view of the duct 72 viewed from the rear. In FIG. 4, in order to show the duct 72 and its mounting configuration, illustration of the fan 71 and its mounting configuration is omitted. The duct 72 is provided below the base 82 and is detachably attached to the base 82. The duct 72 is configured so as to change the direction of the wind sent from the fan 71 downstream of the base 82 in the blowing direction in which the fan 71 sends air along the rotational axis $X_R$ from above to below in the blowing direction. The fan support 81 supports the motor 83 on the downstream side of the fan 71 in the blowing direction.

The duct 72 is provided with a first wind receiving portion 72a facing the rotational shaft 84 in the blowing direction, and a second wind receiving portion 72b curved from the first wind receiving portion 72a so as to be separated from the top plate 82a in the blowing direction. The first wind receiving portion 72a is removable from the base 82.

The duct 72 includes a third wind receiving portion 72c provided on the opposite side of the second wind receiving portion 72b with respect to the first wind receiving portion 72a. The third wind receiving portion 72c is configured to be curved from the first wind receiving portion 72a so as to be separated from the top plate 82a in the blowing direction from the first wind receiving portion 72a.

Figure 11:
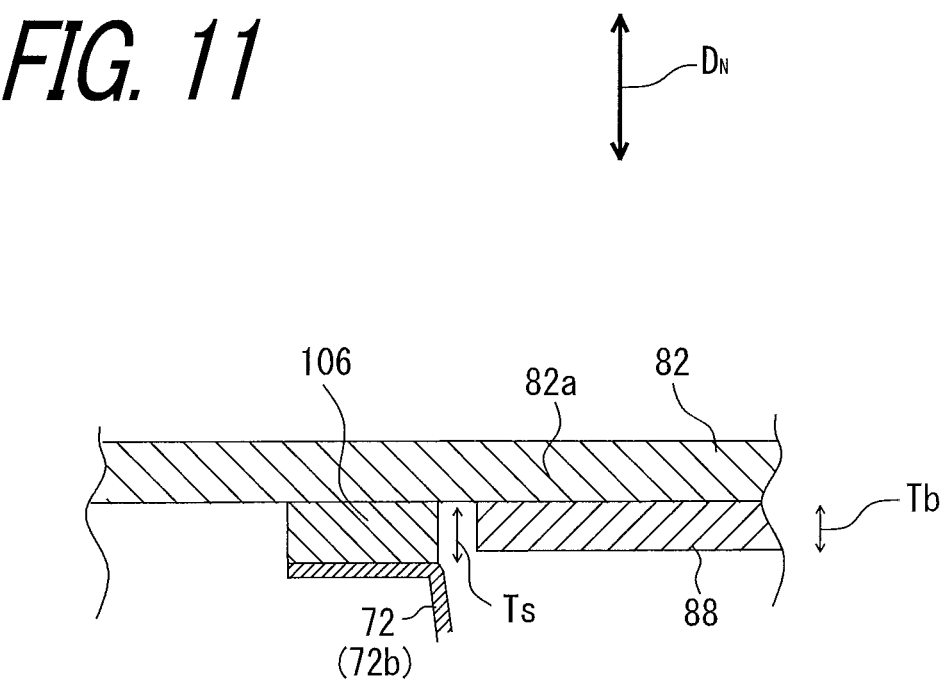
FIG. 11 is an enlarged cross-sectional view of a portion surrounded by a two-dot chain line in FIG. 4.

The fan structure 80 further includes a spacer 106. In FIGS. 5 and 11, the spacer 106 is configured to close a gap between the top plate 82a and the duct 72 (the second air receiving portion 72b) and can be attached to and detached from the gap. Spacer 106, for example, can be attached to the top plate 82a and the duct 72 (second wind receiving portion 72b) by tightening them together with the top plate 82a and the duct 72 (second wind receiving portion 72b) with bolts (not shown) or the like. When the spacer 106 is inserted into the gap between the top plate 82a and the duct 72 (second air receiving portion 72b), the knob 106a protrudes from the gap, so that the spacer 106 can be removed from the gap by pinching the knob 106a.

In FIG. 8, the first slot 94 has a first end 94a and a second end 94b opposite to the first end 94a in the sliding direction $D_{SD}$. In FIG. 9, the second slot 100 has a first end 100a and a second end 100b on the opposite to the first end 100a in the sliding direction $D_{SD}$. In FIG. 10, the third slot 110 has a first end 110a and a second end 110b opposite to the first end 110a in the sliding direction $D_{SD}$. The second end 110b is an opening. In the following description, it is to be noted that among the sliding direction $D_{SD}$ a direction from the second end 94b to the first end 94a is referred to as an extending direction $D_E$.

As described above, by loosening the first bolt 98, the second bolt 104, and the third bolt 114, the fan support 81 can slide in the sliding direction $D_{SD}$ along the opposing surface with respect to the top plate 82a of the base 82. By sliding the fan support 81 along the sliding direction $D_{SD}$ with respect to the top plate 82a, the positional relationship of the fan support 81 with respect to the top plate 82a when the first bolt 98 is located at the first end 94a, the second bolt 104 is located at the first end 100a, and the third bolt 114 is located at the first end 110a is set to the first position shown in FIG. 6. The first position is a normal position where the fan 71 is attached to the base 82 so that the work vehicle 1 can be driven.

FIG. 5 is a view of the fan support 81 and the fan 71 as viewed from below when the fan support 81 is in the first position. Referring to FIG. 5, the base plate 88 has a plate extending portion 88a extending from the first opening 86 in the extending direction DE. At the first position, the plate extending portion 88a substantially covers the open area of the second opening 82b other than the area overlapping the second opening 82b and the first opening 86. As a result, all of the air generated by the fan passes through the first opening 86, so that the blowing efficiency is improved.

After removing the first wind receiving portion 72a and the spacer 106 and loosening the first bolt 98, the second bolt 104, and the third bolt 114, make the fan support 81 slide in the sliding direction $D_{SD}$ with respect to the top plate 82a, and the first bolt 98 is located at the second end 94b and the positional relationship of the second bolt 104 being located at the second end 100b is to be a second position. At the second position, the plate extending portion 88a overlaps with the position where the spacer 106 is attached. In FIG. 5, the outer periphery of the plate extending portion 88a at the second position is indicated by a two-dot chain line. In other words, the spacer 106 is provided on the lower surface of the top plate 82a and is provided in a region within the first slot length L1 from the edge of the second opening 82b in the sliding direction $D_{SD}$.

FIG. 11 is an enlarged cross-sectional view of a portion surrounded by a two-dot chain line in FIG. 4. In FIG. 11, the thickness $T_S$ of the spacer 106 in the surface normal direction $D_N$ when the spacer 106 is attached to the top plate 82a is larger than the thickness $T_b$ of the base plate 88 in the surface normal direction $D_N$. Since the base plate 88 is greatly extended in the extending direction $D_E$, when the spacer 106 is omitted, the duct 72 interferes with the base plate 88 (plate extending portion 88a). Since the thickness of the gap between the top plate 82a and the second wind receiving portion 72b is larger than the thickness of the base plate 88 (the plate extending portion 88a), the base plate 88 can be moved out of the second wind receiving portion 72b through the gap while the second wind receiving portion 72b is attached.

<Operation and Effect of the Embodiment>

The fan structure 80 includes a fan 71, a fan support 81, a base 82, and a motor 83. The fan 71 includes a rotational shaft 84 capable of rotating about the rotational axis $X_R$, and a blade 85 connected to the rotational shaft 84 and rotating about the rotational axis $X_R$ together with the rotational shaft 84. The fan support 81 rotatably supports the rotational shaft 84. The base 82 supports the fan support 81 so as to be slidable in the sliding direction $D_{SD}$. The motor 83 includes a motor main body 83A supported by a fan support 81 on the opposite side of the rotational shaft 84 of the fan 71 in the axial direction along the rotational axis $X_R$, and a motor rotational shaft 83B connected to the rotational shaft 84 so as to rotate the rotational shaft 84. As a result, it is possible to provide the fan structure 80 capable of moving the position of the motor 83 for maintenance.

Figure 7:
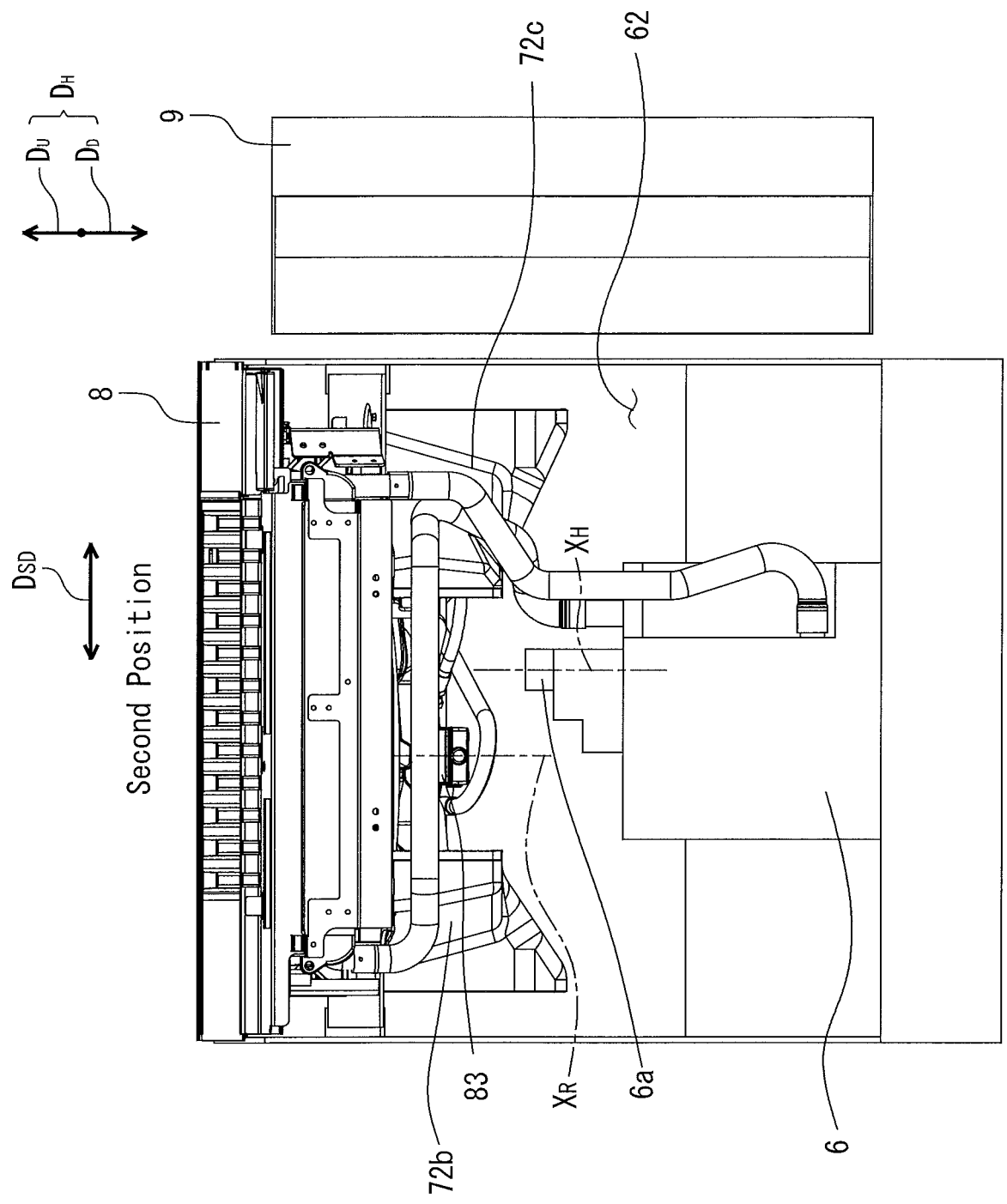
FIG. 7 is a rear view of the fan structure in the second position.

More specifically, the fan structure 80 facilitates maintenance of the cylinder head cover 6a of the engine 6. As shown in FIGS. 4, 6 and 7, the engine 6 has a cylinder head cover for covering the cylinder head. The cylinder head cover 6a projects upward. As shown in FIG. 6, when the base plate 88 is at the first position with respect to the top plate 82a, the motor 83 overlaps with the cylinder head cover 6 as viewed from the height direction DH. Therefore, it is difficult to perform maintenance around the cylinder head cover 6a simply by removing the first wind receiving portion 72a. As shown in FIG. 7, when the base plate 88 is at the second position with respect to the top plate 82a, the motor 83 does not overlap with the cylinder head cover 6a when viewed from the height direction $D_H$. Thus, at the time of maintenance of the cylinder head cover 6a, the base plate 88 is displaced to the second position with respect to the top plate 82a, so that maintenance of the cylinder head cover 6a can be facilitated.

Referring to FIGS. 6 and 7, the rotational axis $X_R$ of the motor 83 when the base plate 88 is at the first position is located between the rotational axis $X_R$ of the motor 83 when the base plate 88 is at the second position and the center line $X_H$ in the horizontal direction of the cylinder head cover 6b in the sliding direction $D_{SD}$. In this manner, the sliding direction $D_{SD}$ is determined so as to reduce the sliding width of the base plate 88.

Furthermore, the first wind receiving portion 72a is provided so as to face the cylinder head cover 6a in the height direction $D_H$. The second wind receiving portion 72b, the first wind receiving portion 72a, and the third wind receiving portion 72c are provided side by side in the sliding direction $D_{SD}$. As a result, the second wind receiving portion 72b and the third wind receiving portion 72c can be provided so as to bulge downward while avoiding an upwardly projecting portion such as the cylinder head cover 6a, so that the dead space of the engine compartment 62 can be efficiently utilized to blow air, and the height of the cover 8 can be reduced. As described above, since the work vehicle 1 has the cab frame 53 which rotates rearward, the lower the height of the cover 8 is, the more advantageous in terms of the easiness of rotation of the cab frame 53. Further, since the second wind receiving portion 72b and the third wind receiving portion 72c are expanded downward to increase the area of the exhaust air outlet, the ventilation resistance can be reduced and the cooling efficiency can be improved. Further, the lower the height of the cover 8 is, the wider the rear visual field from the cabin 5 is, so that the operability of the work vehicle 1 is improved.

As used herein, "comprising" and its derivatives are non-limiting terms that describe the presence of a component, and do not exclude the presence of other components not described. This also applies to "having", "including" and their derivatives.

The terms "member," "part," "element," "body," and "structure" may have multiple meanings, such as a single part or multiple parts.

Ordinal numbers such as "first" and "second" are simply terms used to identify configurations and do not have other meanings (e.g., a particular order). For example, the presence of the "first element" does not imply the presence of the "second element", and the presence of the "second element" does not imply the presence of the "first element".

Terms such as "substantially", "about", and "approximately" indicating degrees can mean reasonable deviations such that the final result is not significantly altered, unless otherwise stated in the embodiments. All numerical values described herein may be interpreted to include words such as "substantially," "about," and "approximately."

In the present application, the phrase "at least one of A and B" should be interpreted to include only A, only B, and both A and B.

In view of the above disclosure, it will be apparent that various changes and modifications of the present invention are possible. Therefore, the present invention may be carried out by a method different from the specific disclosure of the present application without departing from the spirit of the present invention.

What is claimed is:

1. A fan structure comprising:
 a fan comprising:
  a rotational shaft rotatable about a rotational axis; and
  a blade coupled to the rotational shaft to rotate about the rotational axis together with the rotational shaft;
 a fan support rotatably supporting the rotational shaft;
 a base slidably supporting the fan support in a sliding direction; and
 a motor comprising:
  a motor main body supported by the fan support opposite to the rotational shaft of the fan in an axial direction along the rotational axis; and a motor rotational shaft connected to the rotational shaft so as to rotate the rotational shaft,
wherein the fan support comprises:
a base plate having a first opening;
a support plate supporting the motor main body; and
a plurality of beams each connecting the support plate and the base plate,
wherein the base comprises:
an attachment configured to be attached to an exterior frame forming an engine compartment of a work vehicle; and
a top plate having a second opening larger than the first opening and connected to the attachment, and
wherein the fan is supported by the support plate such that the fan passes through the first opening and the second opening.

2. The fan structure according to claim 1, wherein the base plate and the top plate extend in a direction perpendicular to a surface normal direction that is common to the base plate and the top plate.

3. A work vehicle comprising:
an exterior frame forming an engine compartment; and
the fan structure according to claim 1,
wherein the base is connected to the exterior frame, and
wherein the motor is located closer to the engine compartment than the fan.

4. A fan structure comprising:
fan comprising:
a rotational shaft rotatable about a rotational axis; and
a blade coupled to the rotational shaft to rotate about the rotational axis together with the rotational shaft;
a fan support rotatably supporting the rotational shaft;
a base slidably supporting the fan support in a sliding direction; and
a motor comprising:
a motor main body supported by the fan support opposite to the rotational shaft of the fan in an axial direction along the rotational axis; and
a motor rotational shaft connected to the rotational shaft so as to rotate the rotational shaft,
wherein the fan support comprises:
a base plate having a first opening having a size allowing the fan to pass through the first opening;
a support plate supporting the motor main body; and
a plurality of beams each connecting the support plate and the base plate,
wherein the base comprises:
an attachment configured to be attached to an exterior frame forming an engine compartment of a work vehicle; and
a top plate having a second opening larger than the first opening and connected to the attachment, and
wherein the top plate and the base plate are opposed to each other so as to be parallel to the sliding direction.

5. The fan structure according to claim 4, further comprising a first bolt,
wherein a first plate that is one of the base plate and the top plate further has a first slot extending in the sliding direction perpendicular to the surface normal direction,
wherein a second plate that is another of the base plate and the top plate includes a first screw hole which overlaps the first slot as viewed in the surface normal direction and into which the first bolt is insertable, and
wherein a position of the base plate relative to the top plate is fixed by fixing a position of the first bolt in the first slot.

6. The fan structure according to claim 5, further comprising a second bolt,
wherein the first plate further has a second slot extending in the sliding direction perpendicular to the surface normal direction,
wherein the other second plate further includes a second screw hole which overlaps with the second slot as viewed in the surface normal direction and into which the second bolt is insertable, and
wherein the position of the base plate relative to the top plate is fixed by fixing a position of the second bolt in the second slot.

7. The fan structure according to claim 6, further comprising a duct removable from the base and configured to change a direction of a wind sent from the fan on a downstream side of the blowing direction in which the fan sends air to the base,
wherein the blowing direction is along the rotational axis, and
wherein the fan support rotatably supports the rotational shaft on the downstream side of the fan in the blowing direction.

8. The fan structure according to claim 7, further comprising a spacer provided between the top plate and the duct and detachably provided in a gap between the top plate and the duct to close the gap,
wherein the first slot has a first end and a second end opposite to the first end in the sliding direction,
wherein the base plate has a plate extending portion extending from the first opening in an extending direction from the second end to the first end so as to cover a portion of the second opening excluding a portion that overlaps with the first opening as viewed in the surface normal direction when the first bolt is positioned at the first end,
wherein the spacer is provided at a position that overlaps with the plate extending portion as viewed in the surface normal direction when the first bolt is positioned at the second end.

9. The fan structure according to claim 8, wherein a thickness of the spacer in the surface normal direction when the spacer is attached to the top plate is equal to or greater than a thickness of the base plate in the surface normal direction.

10. The fan structure according to claim 5, further comprising a duct removable from the base and configured to change a direction of a wind sent from the fan on a downstream side of the blowing direction in which the fan sends air to the base,
wherein the blowing direction is along the rotational axis, and
wherein the fan support rotatably supports the rotational shaft on the downstream side of the fan in the blowing direction.

11. The fan structure according to claim 10, further comprising a spacer provided between the top plate and the duct and detachably provided in a gap between the top plate and the duct to close the gap,
wherein the first slot has a first end and a second end opposite to the first end in the sliding direction,
wherein the base plate has a plate extending portion extending from the first opening in an extending direction from the second end to the first end so as to cover a portion of the second opening excluding a portion that overlaps with the first opening as viewed in the surface normal direction when the first bolt is positioned at the first end, wherein the spacer is provided at a position that overlaps with the plate extending portion as viewed in the surface normal direction when the first bolt is positioned at the second end.

12. The fan structure according to claim 11, wherein a thickness of the spacer in the surface normal direction when the spacer is attached to the top plate is equal to or greater than a thickness of the base plate in the surface normal direction.

13. The fan structure according to claim 12,
wherein the first slot has a first slot length in the sliding direction, and
wherein the spacer is provided in a region of the top plate within the first slot length from the second opening in the extending direction.

14. The fan structure according to claim 11,
wherein the first slot has a first slot length in the sliding direction, and
wherein the spacer is provided in a region of the top plate within the first slot length from the second opening in the extending direction.

15. The fan structure according to claim 10, wherein the blowing direction is substantially parallel to the surface normal direction.

16. The fan structure according to claim 10,
wherein the duct comprises
a first wind receiving portion opposite to the rotational shaft in the air blowing direction, and
a second wind receiving portion curved from the first wind receiving portion so as to be separated from the top plate in the blowing direction from the first wind receiving portion, and
wherein the first wind receiving portion is detachable from the base.

17. The fan structure according to claim 16, wherein the duct comprises a third wind receiving portion curved from the first wind receiving portion so as to be separated from the top plate in the blowing direction from the first wind receiving portion opposite to the second wind receiving portion with respect to the first wind receiving portion.

18. A work vehicle comprising:
an exterior frame forming an engine compartment; and
the fan structure according to claim 4,
wherein the base is connected to the exterior frame, and
wherein the motor is located closer to the engine compartment than the fan.

19. A work vehicle comprising:
an exterior frame forming an engine compartment;
a fan comprising:
    a rotational shaft rotatable about a rotational axis; and
    a blade coupled to the rotational shaft to rotate about the rotational axis together with the rotational shaft;
a fan support rotatably supporting the rotational shaft;
a base connected to the exterior frame to slidably support the fan support in a sliding direction; and
a motor located closer to the engine compartment than the fan and comprising:
    a motor main body supported by the fan support opposite to the rotational shaft of the fan in an axial direction along the rotational axis; and
    a motor rotational shaft connected to the rotational shaft so as to rotate the rotational shaft; and
an engine including a cylinder head and a cylinder head cover covering the cylinder head,
wherein the fan support is slidable between a first position at which the motor overlaps the cylinder head cover when viewed in a height direction along a height of the work vehicle and a second position at which the motor does not overlap the cylinder head cover when viewed in the height direction.

20. The work vehicle according to claim 19,
wherein the cylinder head cover extends in a direction perpendicular to the height direction and to the sliding direction, and
wherein a center of the motor in a left-right direction perpendicular to the height direction when the fan support is located at the first position is positioned in the sliding direction between the center of the cylinder head cover in the left-right direction and a center of the motor in the left-right direction when the fan support is at the second position.

* * * * *